United States Patent [19]

Loveless

[11] 4,428,276
[45] Jan. 31, 1984

[54] O-RING SEAL FOR PISTON OF DOUBLE-ACTING FLUID PRESSURE CYLINDER

[75] Inventor: Stanley M. Loveless, Oshtemo Township, Kalamazoo County, Mich.

[73] Assignee: Humphrey Products Company, Kalamazoo, Mich.

[21] Appl. No.: 313,039

[22] Filed: Oct. 19, 1981

[51] Int. Cl.³ ............................................. F16J 9/00
[52] U.S. Cl. ...................................... 92/249; 92/175; 277/3
[58] Field of Search ................. 92/175, 185, 247, 248, 92/249, 27, 28, 30, 240; 277/3, 27; 251/DIG. 1

[56] References Cited

U.S. PATENT DOCUMENTS

| | | | |
|---|---|---|---|
| 2,614,793 | 10/1952 | Storm | 251/119 |
| 3,042,431 | 7/1962 | Kryzer | 277/170 |
| 3,733,971 | 5/1973 | Sugimoto | 92/30 |
| 3,938,553 | 2/1976 | Ortega | 137/625 |
| 4,257,315 | 3/1981 | Tissell et al. | 92/27 |

FOREIGN PATENT DOCUMENTS

| | | | |
|---|---|---|---|
| 92730 | 2/1962 | Denmark | 417/511 |
| 2747715 | 2/1979 | Fed. Rep. of Germany | 251/DIG. 1 |

OTHER PUBLICATIONS

Humphrey Products Drawing No. 42E1.
Humphrey Products Drawing No. 42A2.

*Primary Examiner*—Robert E. Garrett
*Assistant Examiner*—Richard L. Klein
*Attorney, Agent, or Firm*—Flynn, Thiel, Boutell & Tanis

[57] ABSTRACT

A double-acting pneumatic cylinder has a housing with a cylindrical chamber therein. A cylindrical piston is supported coaxially in the chamber for movement axially thereof and has a circumferential groove in the outer surface thereof. A pair of spaced, facing annular surfaces and a radially outwardly extending annular rib are provided in the groove, the rib being axially intermediate the annular surfaces. Two passageways in the housing communicate with the chamber on opposite sides of the piston for supplying compressed air to the chamber. A resilient O-ring encircles the piston within the groove and has annular bands of engagement with the chamber and the rib. The O-ring is transversely movable within the groove between two positions having annular bands of engagement with the respective annular surfaces in the groove in response to low air pressure selectively supplied to the chamber through the two passageways. The O-ring deforms elastically in response to a substantial increase in the supplied air pressure so as to increase the contact area and pressure along the annular bands of engagement with the housing chamber and one of the annular surfaces.

9 Claims, 3 Drawing Figures

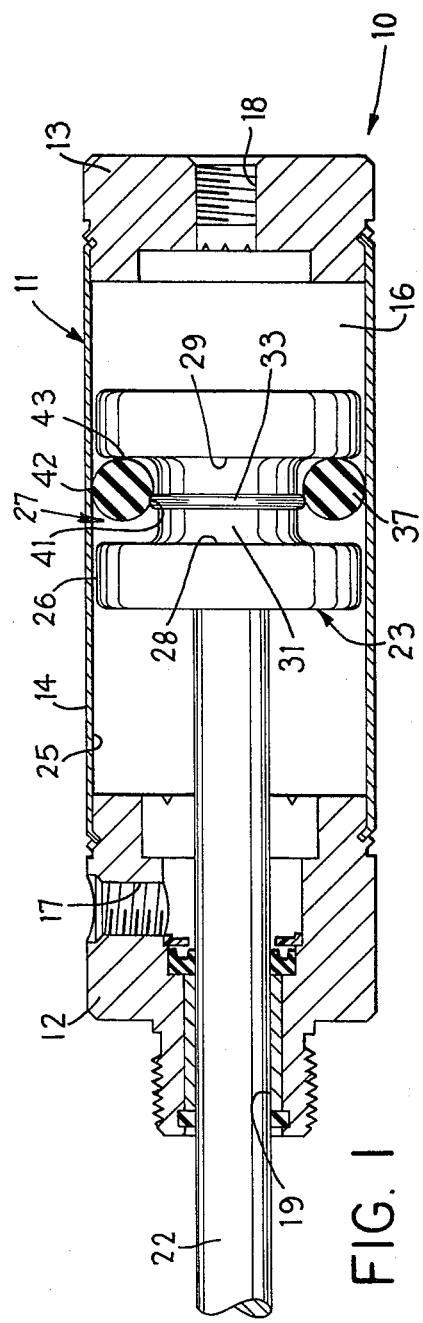
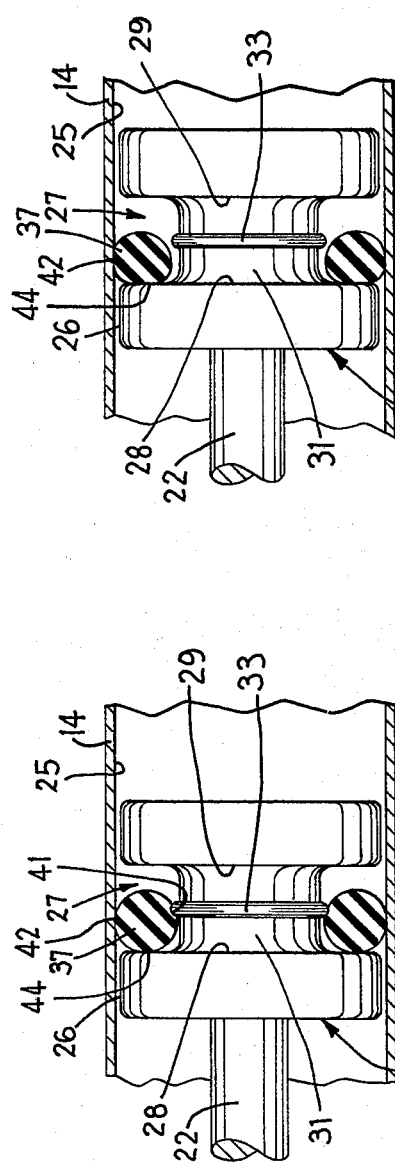

O-RING SEAL FOR PISTON OF DOUBLE-ACTING FLUID PRESSURE CYLINDER

FIELD OF THE INVENTION

This invention relates to a double-acting pneumatic cylinder and, more particularly, to an improved piston seal.

BACKGROUND OF THE INVENTION

Conventional double-acting pneumatic cylinders typically utilize an opposed pair of V-shaped annular seals between the piston and housing, as illustrated, for example, in FIG. 7 of U.S. Pat. No. 4,242,946. When air pressure is applied in one direction, the legs of the V are urged apart to effect a snug sealing engagement between the piston and housing. When air pressure is applied in the other direction, the contact pressure exerted by the seal on the piston and housing and thus the sliding friction between the seal and housing is minimal.

Other cylinders use annular seals of the O-ring type, which seals have certain disadvantages over V-shaped annular seals, including the fact that they are less durable. Although O-ring seals have been used extensively in single-acting pneumatic cylinders, nevertheless they have previously been considered unacceptable for use in double-acting pneumatic cylinders, particularly at relatively low air pressures, such as 10 to 20 psi. First, replacing the two V-shaped seals in a conventional pneumatic cylinder with two O-rings can present a problem because the O-rings do not permit escape of pressure fluid as do the V-shaped seals, which can result in an undesirable pressure lock between the two O-rings. Further, O-rings are typically subject to substantial variances due to manufacturing tolerances. As a result, if the O-ring is fitted between the piston and the housing with sufficient tightness to ensure that air leakage will not occur at high air pressures, the contact pressure between the O-ring and the housing is relatively high and a relatively high breakaway force is required to initiate sliding movement of the O-ring and piston with respect to the housing. Due to the need for a high breakaway force, the pneumatic cylinder is inefficient or even nonresponsive to relatively low air pressures. If, on the other hand, the O-ring is fitted loosely between the piston and the housing so as to reduce the breakaway force required to overcome the sliding friction between the O-ring and housing, the O-ring will typically be susceptible to low pressure air leaks, due in part to the tolerance-based variances, and will still be inefficient or nonresponsive to relatively low air pressures.

Accordingly, it is an object of the present invention to provide a double-acting pneumatic cylinder utilizing a single O-ring to provide a seal between the piston and housing, which seal is effective under both low pressure and high pressure conditions while simultaneously achieving a minimum breakaway force in terms of the frictional engagement between the O-ring and housing.

It is a further object of the invention to provide a double-acting pneumatic cylinder, as aforesaid, in which the desired seal relationship is effected in a consistent manner regardless of tolerance-based variations in the O-ring.

It is a further object of the present invention to provide a double-acting pneumatic cylinder, as aforesaid, which is durable, substantially maintenance-free, and relatively inexpensive to manufacture.

SUMMARY OF THE INVENTION

The objects and purposes of the invention, including those set forth above, are met by providing a double-acting pneumatic cylinder which includes a housing having a substantially cylindrical chamber therein and a cylindrical piston which is supported coaxially in the housing chamber for movement axially thereof. The piston has an annular circumferential groove therearound. The groove defines a pair of opposed, spaced, substantially axially facing annular seal surfaces, and a radially outwardly extending annular rib is located axially intermediate the annular seal surfaces. Ports in the housing communicate with the chamber on opposite sides of the piston for supplying pressurized air to the chamber to effect reciprocal movement of the piston. An elastomeric O-ring encircles the piston within the annular groove. The O-ring has an outside diameter slightly greater than the inside diameter of the housing chamber so as to create an annular band of engagement therewith, and has an inside diameter slightly less than the outside diameter of the annular rib so as to create an annular band of engagement therewith. The O-ring is transversely movable within the groove in response to relatively low air pressures alternatingly supplied to the chamber through the ports between a first position in which it has an annular band of engagement with one of the annular seal surfaces and a second position in which it has an annular band of engagement with the other annular seal surface. The O-ring deforms elastically in response to a substantial increase in the air pressure supplied to the chamber so that the deformed O-ring is free of engagement with the annular rib and has increased contact areas along the annular bands of engagement with the housing chamber and one of the annular seal surfaces. The distance between the annular seal surfaces is greater than the cross-sectional diameter of the O-ring but less than twice such diameter, and is preferably approximately 1.5 times such diameter.

Other objects, purposes and advantages of this invention will be apparent to persons acquainted with pneumatic cylinders upon reading the following detailed description and inspecting the accompanying drawings.

BRIEF DESCRIPTION OF THE DRAWINGS

FIG. 1 is a central sectional view of a double-acting pneumatic cylinder embodying the present invention.

FIG. 2 is a fragmentary view illustrating a different position of operation.

FIG. 3 is a fragmentary view similar to FIG. 2 but illustrating a further position of operation.

Certain terminology will be used in the following description for convenience in reference only and will not be limiting. The words "right" and "left" will designate directions in the drawings to which reference is made. The words "in" and "out" will respectively refer to directions toward and away from the geometric center of the device and designated parts thereof. Such terminology will include the words specifically mentioned, derivatives thereof and words of similar import.

DETAILED DESCRIPTION

FIG. 1 illustrates a double-acting pneumatic cylinder 10 having a housing 11 of generally cylindrical shape. The housing 1 is conventional and is substantially identical to that disclosed in U.S. Pat. No. 4,242,946.

The housing 11 includes a pair of spaced end members 12 and 13 which are rigidly connected by an elongate cylindrical sleeve 14, thereby defining a substantially cylindrical chamber 16 within the housing. Threaded ports or passageways 17 and 18 are provided through the end members 12 and 13, respectively, and communicate with the chamber 16 at opposite ends thereof. A bore 19 is provided through the end member 12 and is coaxial with the axis of the cylindrical sleeve 14.

An elongated cylindrical piston rod 22 projects axially and slidably through the bore 19. A generally cylindrical piston 23 is secured to the inner end of the piston rod 22 and is axially movable within the chamber 16.

The piston 23 has a cylindrical outer surface 26, the diameter of which is slightly less than the diameter of the inner surface 25 of the cylindrical sleeve 14. An annular circumferential groove 27 is provided in the outer surface 26 of the piston 23. The groove 27 is defined between a pair of opposed side surfaces 28 and 29 which are substantially perpendicular to the axis of the piston 23. A substantially cylindrical bottom wall 31 extends between the radially inner edges of the annular side walls 28 and 29. Each side wall 28 and 29 serves as an annular seal surface in a manner described in greater detail hereinafter.

A radially outwardly extending annular rib 33 is provided on the bottom wall 31 of the groove 27, and is located axially approximately midway between the side walls 28 and 29. The outer surface of rib 33 is preferably rounded, and approximates a semi-circle.

An elastomeric O-ring 37 encircles the piston 23 within the annular groove 27. The O-ring 37 has an outside diameter which is slightly greater than the inside diameter of the chamber surface 25, and has an inside diameter which is slightly less than the maximum diameter of the annular rib 33. The width of this rib 33 is substantially less than the cross-sectional diameter of the O-ring 37. The distance between the side walls 28 and 29 is substantially greater than the cross-sectional diameter of the O-ring 37 but less than twice such diameter. In the preferred embodiment illustrated in FIG. 1, the distance between the side walls 28 and 29 is approximately 1.5 times the cross-sectional diameter of the O-ring 37.

The O-ring 37 normally has an inner annular band of engagement 41 with the rib 33 and an outer annular band of engagement 42 with the chamber surface 25. The O-ring 37 can move transversely within the groove 27 between the positions illustrated in FIGS. 1 and 2 by rocking on the annular rib 33 and sliding along the chamber surface 25 in a manner described in greater detail hereinafter. During this movement, the annular bands of engagement 41 and 42 between the O-ring 37 and the rib 33 and surface 25, respectively, are not interrupted. In the position illustrated in FIG. 1, the O-ring 37 is disposed against and has an annular band of engagement 43 with the side wall 29 of the groove 27. In the position illustrated in FIG. 2, the O-ring 37 is disposed against and has an annular band of engagement 44 with the side wall 28 of the groove 27.

Preferably, the groove 27 is sufficiently deep and the annular rib 33 is sufficiently high so that no contact occurs between the O-ring 37 and the bottom wall 31 of the groove 27 at any time.

OPERATION

FIG. 1 illustrates the position of O-ring 37 when air at low pressure is supplied to chamber 16 through passageway 17 to effect rightward movement of piston 23. To thereafter move the piston 23 to the left, low pressure compressed air is supplied to the chamber 16 on the right hand side of the piston 23 through the passageway 18. This pressurized air passes between the surfaces 25 and 26 and urges the O-ring 37 leftwardly so that it sealingly engages side surface 28 as shown in FIG. 2.

The rib 33 projects into and deforms the O-ring 37 but, due to the fact that the rib 33 is relatively narrow, the deformation of the O-ring is localized at its inner periphery and does not cause deformation or excessive contact pressure at the annular band of engagement 42 with the chamber surface 25. In this manner, the desired sealed relationship for confining and containing low pressure air is achieved along the annular bands of engagement 41 and 42, regardless of tolerance-based variations in the O-ring, while at the same time minimum pressure and friction exists between the O-ring 37 and chamber surface 25 along the annular band of engagement 42, thereby minimizing the breakaway force required to initiate movement between the O-ring 37 and the chamber surface 25.

Accordingly, the compressed air entering the chamber 16 through the passageway 18 and urging the O-ring 37 leftwardly causes the O-ring 37 to rock leftwardly about the annular rib 33 while sliding along the chamber surface 25 until it reaches the position illustrated in FIG. 2 in which the O-ring 37 is disposed against the annular surface 28. Thereafter, the low pressure compressed air supplied through the passageway 18 will effect leftward movement of the piston 23 within the chamber 16.

If the pressure of the compressed air supplied to the chamber 16 through the passageway 18 is substantially increased, substantial deformation of the O-ring 37 will result, as illustrated in FIG. 3. More specifically, the high pressure urges the O-ring against the chamber surface 25 and the annular surface 28 with greater force and causes the O-ring to flatten somewhat at the points of contact with these surfaces, thereby increasing the contact area and pressure along the respective annular bands of engagement 42 and 44. At the same time, the O-ring 37 is moved out of engagement with the annular rib 33, thereby interrupting entirely the annular band of engagement 41 between the O-ring 37 and rib 33.

The increased contact area and contact pressure caused along the annular bands of engagement 42 and 44 by the introduction of high pressure air to the chamber 16 creates a more secure sealed relationship between the O-ring 37 and the annular surface 28 and chamber surface 25, thereby creating the requisite high pressure seal. Although the increased contact area and contact pressure between the O-ring 37 and chamber surface 25 will increase the sliding friction between the O-ring 37 and chamber surface 25, the relatively high air pressure supplied to the chamber 16 will be capable of generating the larger breakaway force required to overcome the increased friction. When the supply of high pressure compressed air through the passageway 18 is terminated, the resilient O-ring 37 will return to its normal shape and assume the position illustrated in FIG. 2.

To subsequently effect a rightward movement of the piston 23 within the chamber 16, compressed air is supplied to the chamber 16 through the passageway 17.

Since the groove 27 is symmetric about a plane containing the rib 33, the O-ring 37 moves from the position illustrated in FIG. 2 to the position illustrated in FIG. 1 in a manner similar to that described above. Similarly, if compressed air is supplied through the opening 17 at a relatively high pressure, the O-ring is urged against the annular surface 29 and the chamber surface 25 with sufficient force to effect a deformation similar to that illustrated in FIG. 3.

Although a preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A double-acting pneumatic cylinder, comprising:
 a housing having a substantially cylindrical chamber therein;
 a piston of circular cross section supported coaxially in said housing chamber for movement axially thereof, said piston having an annular circumferential groove in a radially outer surface thereof, said groove being defined between a pair of opposed, spaced, substantially axially facing annular surfaces;
 said piston also having an annular rib extending radially outwardly from the bottom of said groove in axially spaced relationship between said annular surfaces, the radially outward extension of said rib from the bottom of said groove being a small fraction of the radial depth of the groove;
 means defining two passageways in said housing which communicate with said chamber on opposite sides of said piston for conducting pressurized air to said chamber; and
 an elastomeric O-ring encircling said piston within said annular groove, said O-ring having an outside diameter slightly greater than the inside diameter of said housing chamber and a first annular band of engagement with said housing chamber, said O-ring having an inside diameter slightly less than the outside diameter of said annular rib and a second annular band of engagement with said rib, the axial width of said annular rib being substantially less than the cross-sectional diameter of said O-ring, and said O-ring being transversely movable within said groove in respose to low air pressure selectively supplied to said chamber through said passageways by rocking on said rib and simultaneously sliding along the wall of said housing chamber between a first position having a third annular band of engagement with one said annular surface of said piston and a second position having said third annular band of engagement with the other said annular surface of said piston.

2. The pneumatic cylinder of claim 1, wherein said resilient O-ring deforms elastically in response to a substantial increase in the air pressure supplied to said chamber, said deformed O-ring being free of engagement with said annular rib and having increased contact areas along said annular bands of engagement with said housing chamber and said annular surface on said piston.

3. The pneumatic cylinder of claim 1, wherein the radially outer edge of said annular rib is rounded.

4. The pneumatic cylinder of claim 1 or claim 2, wherein the distance between said annular surfaces on said piston is substantially greater than the cross-sectional diameter of said O-ring but less than twice the cross-sectional diameter of said O-ring.

5. The pneumatic cylinder of claim 4, wherein the distance between said annular surfaces on said piston is approximately 1.5 times the cross-sectional diameter of said O-ring.

6. The pneumatic cylinder of claim 1 or claim 2, wherein said groove in said piston has a pair of spaced, annular side walls which are substantially perpendicular to the axis of said chamber and a substantially cylindrical bottom wall which extends between the radially inner edges of said side walls, each said annular surface being defined by a respective said side wall, said rib being provided on and projecting radially outwardly from said bottom wall, and said O-ring being free of contact with said bottom wall at all times.

7. The pneumatic cylinder of claim 1, wherein said piston has a substantially cylindrical outer surface having a diameter slightly less than the inside diameter of said housing chamber, said annular groove being provided in said cylindrical outer surface.

8. A double-acting pneumatic cylinder, comprising:
 a housing having a substantially cylindrical chamber therein;
 a piston of circular cross section supported coaxially in said housing chamber for movement axially thereof, said piston having an annular circumferential groove in a radially outer surface thereof, said groove being defined between a pair of opposed, spaced, substantially axially facing annular surfaces, and a radially outwardly extending annular rib in said groove axially intermediate said annular surfaces;
 means defining two first passageways in said housing which communicate with said chamber on opposite sides of said piston for conducting pressurized air to said chamber;
 means defining two second passageways associated with said piston for conducting pressurized air to respective opposite axial ends of said groove; and
 an elastomeric O-ring encircling said piston within said annular groove, said O-ring having an outside diameter slightly greater than the inside diameter of said housing chamber and an annular band of engagement with said housing chamber, said O-ring also having an inside diameter slightly less than the outside diameter of said annular rib and an annular band of engagement with said rib, said O-ring being transversely movable within said groove in response to low air pressure selectively supplied to said chamber through said first passageways and then to said groove through said second passageways by rocking on said rib and simultaneously sliding along the wall of said housing chamber between a first position having an annular band of engagement with one said annular surface of said piston and a second position having an annular band of engagement with the other said annular surface of said piston, said O-ring being free of contact with the bottom of said groove at all times, and said O-ring deforming elastically in response to a substantial increase in air pressure supplied to said chamber, said deformed O-ring being free of engagement with said annular rib and having increased contact areas along said annular bands of engagement with said housing chamber and one said annular surface on said piston.

9. The pneumatic cylinder of claim 8, wherein only a single said O-ring encircles said piston, the width of said annular rib is substantially less than the cross-sectional diameter of said O-ring, the radially outer edge of said annular rib is rounded, the distance between said annular surfaces on said piston is substantially greater than the cross-sectional diameter of said O-ring but less than twice the cross-sectional diameter of said O-ring, and said second passageways are defined by annular clearances around the radially outer surface of said piston, such that said radially outer surface of said piston is slightly separated from the inner surface of said housing.

* * * * *